United States Patent
Becker et al.

(10) Patent No.: US 6,398,308 B1
(45) Date of Patent: Jun. 4, 2002

(54) ADJUSTING DEVICE FOR A MOTOR VEHICLE SEAT

(75) Inventors: Burckhard Becker, Solingen; Heinz-Jürgen Wagener, Remscheid; Wilhelm Wingensiefen, Wermelskirchen, all of (DE)

(73) Assignee: C. Rob Hammerstein GmbH & Co. KG (DE)

( * ) Notice: Subject to any disclaimer, the term of this patent is extended or adjusted under 35 U.S.C. 154(b) by 15 days.

(21) Appl. No.: 09/602,551

(22) Filed: Jun. 23, 2000

(30) Foreign Application Priority Data

Sep. 18, 1999 (DE) .......................................... 199 44 866

(51) Int. Cl.[7] ................................................. B60N 2/02
(52) U.S. Cl. ........................ 297/367; 297/366; 297/362; 297/216.13
(58) Field of Search ................................ 297/367, 238, 297/366, 378.12, 362, 356, 368, 216.13; 475/162

(56) References Cited

U.S. PATENT DOCUMENTS

| | | | | |
|---|---|---|---|---|
| 3,887,232 A | * | 6/1975 | Dinkel ........................ 297/367 |
| 4,732,425 A | * | 3/1988 | Terada et al. ................ 297/362 |
| 4,762,366 A | * | 8/1988 | Bauer et al. ................. 297/367 |
| 5,590,932 A | * | 1/1997 | Olivieri ....................... 297/367 |
| 5,788,330 A | * | 8/1998 | Ryan ...................... 297/378.12 |
| 6,260,923 B1 | * | 7/2001 | Yamada et al. ............. 297/366 |
| 6,283,886 B1 | * | 9/2001 | Schumann ................... 475/162 |

* cited by examiner

Primary Examiner—Carl D. Friedman
Assistant Examiner—Basil Katcheves
(74) Attorney, Agent, or Firm—Akerman Senterfitt

(57) ABSTRACT

The invention relates to an adjusting device for a motor vehicle seat with a first adjusting arm (20), with a second adjusting arm (22) that is arranged opposite the first adjusting arm (20) so as to be rotatable about an axle (24), with a drive shaft (32) allocated to the first adjusting arm (20) that has a free end and carries a pinion (36), and with a toothed quadrant (38) formed in the second adjusting arm (22) and meshing with the pinion (36). A supporting part (44) is formed on the second adjusting arm (22), wherein said supporting part (44) is located in the vicinity of the drive shaft (32), is positioned near the drive shaft (32) radially outside thereof when the pinion (36) is subjected to normal load and gets in contact with the drive shaft (32) and supports it when the pinion (36) is subjected to heavy load, particularly when the pinion (36) is subjected to a load occasioned by an accident.

12 Claims, 1 Drawing Sheet

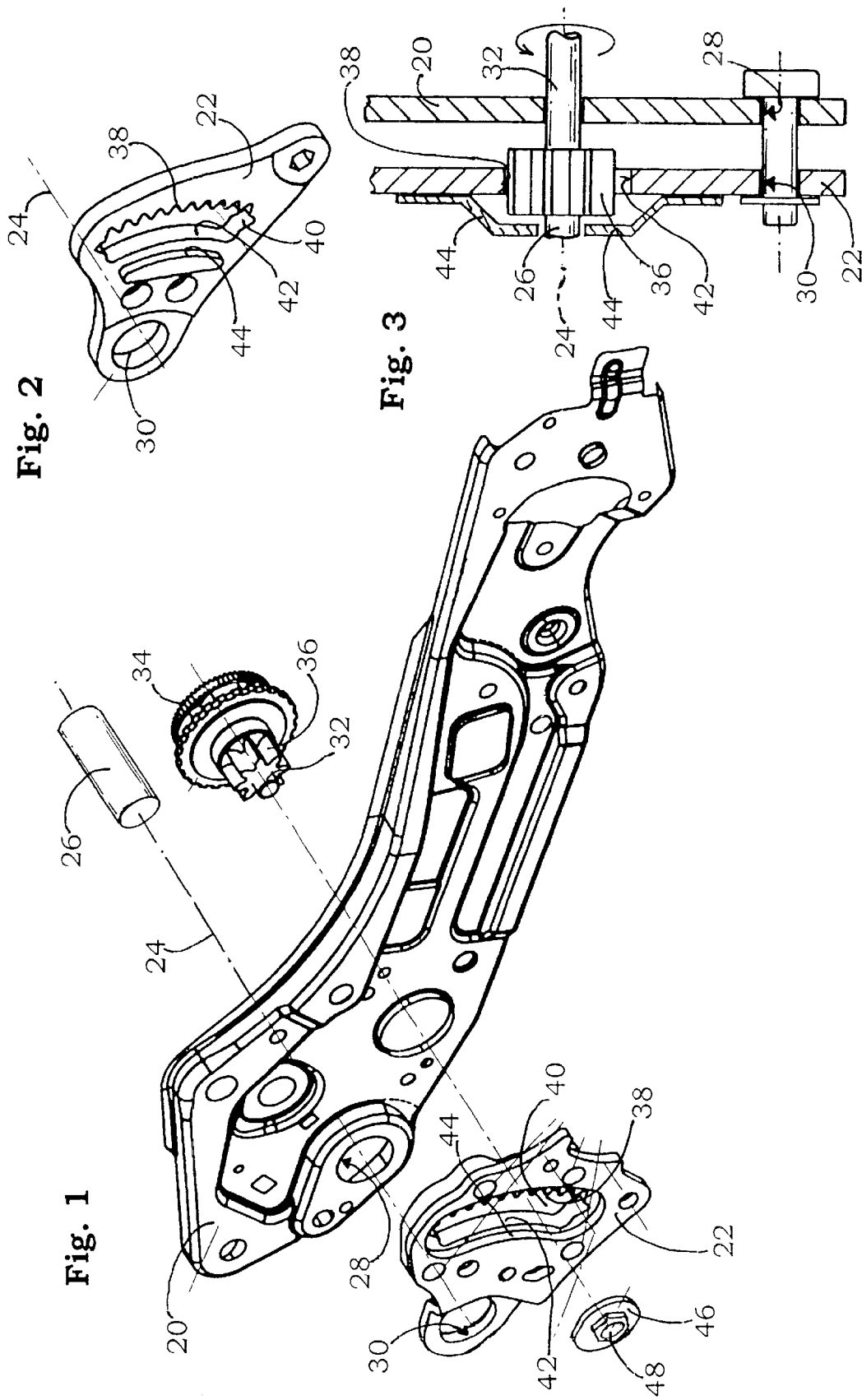

ADJUSTING DEVICE FOR A MOTOR VEHICLE SEAT

The invention relates to an adjusting device for a motor vehicle seat
- with a first adjusting arm,
- with a second adjusting arm that is arranged opposite the first adjusting arm so as to be rotatable about an axle,
- with a drive shaft allocated to the first adjusting arm that has a free end and carries a pinion, and
- with a toothed quadrant formed in the second adjusting arm and meshing with the pinion.

Such adjusting devices for vehicle seats are commonly known, they are being used in many different ways.

A motor vehicle seat is kept in a determined adjusting position by means of the adjusting device. If for example the adjusting device is allocated to a height adjusting device of the seat area relative to an underbody, it is responsible for the height position of the seat area and retains for example two adjusting arms in the angular position set by the user. In case of a failure of the adjusting device, if, for example the axle of the pinion breaks or if the pinion disengages from the toothed quadrant, the position of the motor vehicle seat changes. In case of a deceleration of the motor vehicle fitted with the motor vehicle seat in the event of an accident, this may lead to considerable injuries of the occupants. Therefor, the adjusting devices have to be capable of withstanding the high forces occurring during accelerations occasioned by an accident. They should however not be dimensioned with too high cross sections by having for example stability achieved by conferring the different parts the highest possible rigidity, since this increases the overall weight of the motor vehicle seat on one side and on the other makes it stiff so that the frame of the motor vehicle seat itself is no longer capable of reducing kinetic energy in case of an accident.

The object of the present invention is therefore to develop the adjusting devices of the type mentioned above in such a way that, in the case of loads occasioned by an accident, the mesh between pinion and toothed quadrant is kept up even when the pinion and the toothed quadrant are moving against each other.

On the basis of the adjusting device of the type mentioned above, the solution of this object is to have a supporting part formed on the second adjusting arm, wherein said supporting part a) is located in the vicinity of the drive shaft, b) is positioned near the drive shaft radially outside thereof when the pinion is subjected to normal load and c) gets in contact with the drive shaft and supports it when the pinion is subjected to heavy load, particularly when the pinion is subjected to a load occasioned by an accident.

The supporting part on the second adjusting arm effects an abutment for the drive shaft and prevents it from deforming too much under loads occasioned by an accident. Under normal driving conditions, the supporting part does not get in contact with the drive shaft, it is separated therefrom by an air gap. Only when the deformation of the drive shaft and/or of the toothed quadrant has reached a determined degree, the drive shaft gets in contact with the supporting part, thus preventing the pinion from disengaging further from the toothed quadrant. The supporting part thus offers additional safety which is not noticeable under normal driving conditions but which is brought to bear when accelerating forces are established during an accident, in which case it provides an additional support. By dimensioning the different parts, the threshold value that must be reached for the load in order to enable a contact between the drive shaft and the supporting part can be calculated and adjusted. This contact takes place at a time when the relative motion between pinion and toothed quadrant is still far less than the motion required to bring both parts to disengage.

Since, under normal operating conditions of the motor vehicle, the supporting part has no contact with the drive shaft, particular accuracy such as a precise configuration and the like are not necessary. Compared to a second bearing arranged on the free end of the drive shaft, much saving is done while keeping up comparable safety, said saving concerning component parts, assembly expenditures and weight. The free spacing between the drive shaft and the supporting part can be such that strong excursions of the parts of the adjusting device already bring the drive shaft into contact with the supporting part, wherein said excursions are still resilient. It is however also possible and even preferred that the air gap between the supporting part and the drive shaft is only overcome when the deformation of the associated parts is plastic. In this case, the abutment of the supporting part on the drive shaft is at the same time evidence of the necessity to have the corresponding adjusting device and with it the motor vehicle seat either repaired or exchanged depending on the situation.

The arrangement of a supporting part according to the invention permits to provide a support with relatively small mechanical expenditure and possibly without additional weight and additional component parts, said support proving its efficiency even under high acceleration forces as they are occasioned in a rear or in a frontal crash.

In a particularly preferred development, the supporting part is designed as a supporting arch, which exhibits a course that is concentric with the axle of the adjusting device. When the adjusting device is adjusted, the pinion changes its position alongside the toothed quadrant, the position of the axle relative to the second adjusting arm changing at the same time. Thanks to the arch-like shape that has been given to the supporting part, support is obtained for any position of the axle relative to the second adjusting arm.

In a particularly preferred embodiment, the drive shaft is connected with a disk in the vicinity of the pinion, said disk being located near the supporting part when the pinion is subjected to a normal load and getting in contact with the supporting part on which it rests when the pinion is subjected to heavy load, particularly when it is subjected to load in the event of an accident. This disk provides additional safety. The disk can be so big and be arranged on the free end of the drive shaft so that axial movement of the second adjusting arm away from the first adjusting arm is hindered. The reverse motion, that is the movement of the second adjusting arm toward the first adjusting arm, is limited by causing both arms to hit against each other. As a result, the second adjusting arm cannot move so far away from the first adjusting arm and thus from the pinion that the pinion axially disengages from the toothed quadrant.

In a preferred embodiment the toothed quadrant is formed on the edge of an arched oblong hole in the second adjusting arm. On the second adjusting arm, a supporting arch protrudes on said oblong hole and completely encircles it. This arch supports the axle and in particular the disk across the longitudinal direction of the toothed quadrant and the direction of the axle.

Further advantages and characteristics of the invention will become clear in the remaining claims and in the following description of embodiments that are only examples and not limiting the scope of the invention, said embodiments being explained in more detail with respect to the drawing. In this drawing FIG. 1 shows a perspective view of an adjusting device for a motor vehicle seat, FIG. 2 shows a perspective view of a second adjusting arm in an alternative embodiment with respect to FIG. 1 and FIG. 3 shows a sectional view of an adjusting device in a variant of FIG. 1.

The adjusting device for a motor vehicle seat as it is illustrated in FIG. 1 has a first adjusting arm 20 designed as a side part of a seat carrier. A second adjusting arm 22 is additionally provided. Said second adjusting arm is arranged so as to be rotatable about an axle 24 relative to the first adjusting arm 20. To form this hinge joint between the two adjusting arms 20, 22, an axle journal 26 penetrates into a bore 28 in the first adjusting arm 20 and into a bore 30 in the second adjusting arm 22.

A drive shaft 32 is rotatably supported in the first adjusting arm 20. To this effect, a locking gear designed as a well-known clamp roller free wheel 34 is assigned to the first adjusting arm 20. The drive shaft 32 is provided on its power take off side, it is provided with a pinion 36. A toothed quadrant 38 running in a centric manner relative to the axle 24 is formed in the second adjusting arm 22. This toothed quadrant 38 has teeth that mesh with teeth on the pinion 36.

The toothed quadrant 38 is located inside a curved oblong hole 40. Seen from the axis 24, the toothed quadrant 38 constitutes the remote edge 42 of this oblong hole 40. Opposite the toothed quadrant 38 there is an edge of the oblong hole 40 that is also concentric with the axle 24, this edge 42 however has no teeth. Within this oblong hole 40, the second adjusting arm 22 can be adjusted within a certain angular range relative to the first adjusting arm 20, the angular range being defined by the oblong hole 40.

A supporting part 44 is provided on the second adjusting arm 22, it is located on the side of the toothed quadrant 38 that is turned away from the first adjusting arm 20. As a result, it is allocated to a free end of the drive shaft 32. This free end is provided with a thread. A disk 46 is pushed on the free end of the drive shaft, it is kept in place by means of a nut 48.

The supporting part 44 has the shape of an oblong hole that is slightly longer and wider than the oblong hole 40, but that has the same central line than the oblong hole 40. This supporting part 44 is designed in such a way that the disk 46, which is allocated to the drive shaft 32, is lying in the same plane as the supporting part 44 on one side and that, on the other side, the disk 46 is normally always spaced from the supporting part 44. Accordingly, the supporting part 44 normally does not get in contact with the inner arch nor with the outer arch defined by the supporting part 44.

The supporting part 44 constitutes a salient edge exhibiting a course that is radial relative to the axle 24 of the drive shaft 32. It only gets in contact with the disk 46 when the adjusting device is subjected to a load occasioned by an accident. In that case, the circumferential edge of the disk 46 is supported by the supporting part 44 and prevents the free end of the drive shaft 32 from deviating further relative to the toothed quadrant 38.

The diameter of the disk 46 is greater than the width of the oblong hole 40. This width is measured on a radial line relative to the axle 24. Thanks to the thus dimensioned diameter of the disk 46, the disk cannot be pulled through the oblong hole 40. As a result, it can, in case of a load occasioned by an accident, also come to lean against the area located between the supporting part 44 and the oblong hole 40. This area has got the shape of a shoulder. The disk 46 also has a greater diameter than the outer diameter of the pinion 36. The diameter of the disk 46 is preferably at least 1.2 times, in particular 1.5 times bigger than the outer diameter of the pinion 36.

The disk 46 is located in the nearest neighbourhood of the free end of the drive shaft 32. The drive shaft 32 is only carried in bearings on one side, that is in the first adjusting arm 20. It is not carried in bearings in the second adjusting arm 22 or in a part of the second adjusting arm 22, which is opposite the first adjusting arm 20.

FIG. 2 shows another embodiment of the second adjusting arm 22. Here, the supporting part 44 is not designed as a curved oblong hole but only as an arch located between the toothed quadrant 38 and the bore 30. The thus configured supporting part 44 prevents the pinion 36 from separating from the toothed quadrant 38. It is accordingly arranged in such a way that it prevents the pinion 36 from disengaging from the teeth of the toothed quadrant 38.

In the embodiment according to FIG. 3, the supporting part 44 is made of two bent sheet metals that form, between the two of them, a curved slot exhibiting a centric course relative to the axle 24. Inside the slot there is the free end area of the drive shaft 32, separated by an air gap. In the event of an excursion of the drive shaft 32 occasioned by an accident, said drive shaft hits against the upper or the lower sheet metal of the supporting part 44. The lower sheet metal of the supporting part 44 is hereby the important part, since this sheet metal prevents the pinion 36 from separating further from the toothed quadrant 38.

What is claimed is:

1. An adjusting device for a motor vehicle seat, said adjusting device comprising in combination:

a first adjusting arm;

a second adjusting arm arranged opposite the first adjusting arm so as to be rotatable about an axle;

a drive shaft allocated to the first adjusting arm, wherein the drive shaft has a free end and carries a pinion; and a toothed quadrant formed in the second adjusting arm and meshing with the pinion;

wherein a supporting part is formed on the second adjusting arm;

wherein said supporting part is located in the vicinity of the drive shaft, positioned near the drive shaft radially outside thereof when the pinion is subjected to normal load and directly contacts the drive shaft and supports it when the pinion is subjected to heavy load, particularly when the pinion is subjected to a load occasioned by an accident.

2. The adjusting device according to claim 1, wherein the supporting part is designed as a supporting arch, which i) exhibits a course that is concentric with the axle, which ii) is positioned near the supporting part when the pinion is subjected to normal load and which iii) gets in contact with the supporting part and leans against it when the pinion is subjected to heavy load, particularly when the pinion is subjected to a load occasioned by an accident.

3. The adjusting device according to claim 1, wherein the drive shaft is provided with a disk in the vicinity of the pinion.

4. The adjusting device according to claim 3, wherein the disk is arranged in the vicinity of the pinion and furtheron removably connected to the drive shaft.

5. The adjusting device according to claim 3, wherein the diameter of the disk is at least 1.2 times, bigger than the outer diameter of the pinion.

6. The adjusting device according to claim 3, wherein the free end of the drive shaft is provided with a fastening means.

7. The adjusting device according to claim 1, wherein the supporting part is arranged opposite an area of the drive shaft that is located between the pinion and the free end.

8. The adjusting device according to claim 1, wherein the toothed quadrant is formed on an edge area of an arch-shaped oblong hole and that a salient supporting arch is provided that completely encircles said oblong hole on the second adjusting arm.

9. The adjusting device according to claim 1, wherein the toothed quadrant is formed on an edge area of an arch-shaped oblong hole and that the diameter of the disk is greater than the width of the oblong hole.

10. The adjusting device according to claim 1, wherein the pinion is arranged on a drive shaft of a gear and the first adjusting arm is located between said gear or and the second adjusting arm.

11. The adjusting device according to claim 1, wherein the diameter of the disk is at least 1.5 times bigger than the outer diameter of the pinion.

12. The adjusting device according to claim 3, wherein the free end of the drive shaft is provided with a blind tap hole receiving a screw, which holds the disk.

* * * * *